US011655685B2

(12) United States Patent
Al-Mousa et al.

(10) Patent No.: US 11,655,685 B2
(45) Date of Patent: May 23, 2023

(54) DOWNHOLE WELDING TOOLS AND RELATED METHODS

(71) Applicant: Saudi Arabian Oil Company, Dhahran (SA)

(72) Inventors: Ahmed Al-Mousa, Dhahran (SA); Marius Neacsu, Dhahran (SA); Qadir Looni, Dhahran (SA); Omar M Alhamid, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 196 days.

(21) Appl. No.: 16/989,327

(22) Filed: Aug. 10, 2020

(65) Prior Publication Data
US 2022/0042390 A1 Feb. 10, 2022

(51) Int. Cl.
*E21B 29/10* (2006.01)
*E21B 47/117* (2012.01)
(Continued)

(52) U.S. Cl.
CPC .......... *E21B 29/10* (2013.01); *B23K 37/0276* (2013.01); *E21B 33/1212* (2013.01);
(Continued)

(58) Field of Classification Search
CPC ... E21B 29/10; E21B 47/117; B23K 37/0276; B23K 9/0284; F16B 31/00; F16L 55/1645
See application file for complete search history.

(56) References Cited

U.S. PATENT DOCUMENTS

| 880,404 A | 2/1908 | Sanford |
| 1,392,650 A | 10/1921 | Mcmillian |

(Continued)

FOREIGN PATENT DOCUMENTS

| AU | 636642 | 5/1993 |
| AU | 2007249417 | 11/2007 |

(Continued)

OTHER PUBLICATIONS

PCT International Search Report and Written Opinion in International Appln. No. PCT/US2021/045332, dated Oct. 27, 2021, 13 pages.

(Continued)

*Primary Examiner* — Nicole Coy
*Assistant Examiner* — Nicholas D Wlodarski
(74) *Attorney, Agent, or Firm* — Fish & Richardson P.C.

(57) ABSTRACT

A downhole welding tool includes a tool body and a welding device coupled to the tool body. The welding device includes a carrier arm reversibly pivotable between a collapsed configuration of the welding device in which the carrier arm is oriented parallel to the tool body and an extended configuration of the welding device in which the carrier arm projects outward from the tool body at an acute angle relative to the tool body, as well as a consumable welding tip secured to the carrier arm. The downhole welding tool also includes a rotatable actuator coupled to the tool body adjacent the welding device and configured to adjust the carrier arm between the collapsed configuration and the extended configuration.

19 Claims, 8 Drawing Sheets

(51) Int. Cl.
- *E21B 33/12* (2006.01)
- *B23K 37/02* (2006.01)
- *F16B 31/00* (2006.01)
- *F16L 55/1645* (2006.01)

(52) U.S. Cl.
CPC ............ *E21B 47/117* (2020.05); *F16B 31/00* (2013.01); *F16L 55/1645* (2013.01)

(56) References Cited

U.S. PATENT DOCUMENTS

| | | |
|---|---|---|
| 1,580,352 A | 4/1926 | Ercole |
| 1,591,264 A | 7/1926 | Baash |
| 1,621,947 A | 3/1927 | Moore |
| 1,638,494 A | 8/1927 | Lewis et al. |
| 1,789,993 A | 1/1931 | Switzer |
| 1,896,482 A | 2/1933 | Crowell |
| 1,949,498 A | 3/1934 | Frederick et al. |
| 2,121,002 A | 6/1938 | Baker |
| 2,121,051 A | 6/1938 | Ragan et al. |
| 2,187,487 A | 1/1940 | Burt |
| 2,189,697 A | 2/1940 | Baker |
| 2,222,233 A | 11/1940 | Mize |
| 2,286,075 A | 6/1942 | Evans |
| 2,304,793 A | 12/1942 | Bodine |
| 2,316,402 A | 4/1943 | Canon |
| 2,327,092 A | 8/1943 | Botkin |
| 2,411,260 A | 11/1946 | Glover et al. |
| 2,481,637 A | 9/1949 | Yancey |
| 2,546,978 A | 4/1951 | Collins et al. |
| 2,580,026 A * | 12/1951 | Jacobi .................. E05B 15/004 |
| | | 74/504 |
| 2,638,988 A | 5/1953 | Williams |
| 2,663,370 A | 12/1953 | Robert et al. |
| 2,672,199 A | 3/1954 | McKenna |
| 2,701,019 A | 2/1955 | Steed |
| 2,707,998 A | 5/1955 | Baker et al. |
| 2,728,599 A | 12/1955 | Moore |
| 2,745,693 A | 5/1956 | Mcgill |
| 2,751,010 A | 6/1956 | Trahan |
| 2,778,428 A | 1/1957 | Baker et al. |
| 2,806,532 A | 9/1957 | Baker et al. |
| 2,881,838 A | 4/1959 | Morse et al. |
| 2,912,053 A | 11/1959 | Bruekelman |
| 2,912,273 A | 11/1959 | Chadderdon et al. |
| 2,915,127 A | 12/1959 | Abendroth |
| 2,965,175 A | 12/1960 | Ransom |
| 2,965,177 A | 12/1960 | Le Bus et al. |
| 3,023,810 A | 3/1962 | Anderson |
| 3,116,799 A | 1/1964 | Lemons |
| 3,147,536 A | 9/1964 | Lamphere |
| 3,225,828 A | 12/1965 | Wisenbaker et al. |
| 3,308,886 A | 3/1967 | Evans |
| 3,352,593 A | 11/1967 | Webb |
| 3,369,603 A | 2/1968 | Trantham |
| 3,380,528 A | 4/1968 | Durwood |
| 3,381,748 A | 5/1968 | Peters et al. |
| 3,382,925 A | 5/1968 | Jennings |
| 3,437,136 A | 4/1969 | Young |
| 3,667,721 A | 6/1972 | Vujasinovic |
| 3,897,038 A | 7/1975 | Le Rouax |
| 3,915,426 A | 10/1975 | Le Rouax |
| 4,030,354 A | 6/1977 | Scott |
| 4,039,798 A | 8/1977 | Lyhall et al. |
| 4,042,019 A | 8/1977 | Henning |
| 4,059,155 A | 11/1977 | Greer |
| 4,099,699 A | 7/1978 | Allen |
| 4,190,112 A | 2/1980 | Davis |
| 4,227,573 A | 10/1980 | Pearce et al. |
| 4,254,983 A | 3/1981 | Harris |
| 4,276,931 A | 7/1981 | Murray |
| 4,296,822 A | 10/1981 | Ormsby |
| 4,349,071 A | 9/1982 | Fish |
| 4,391,326 A | 7/1983 | Greenlee |
| 4,407,367 A | 10/1983 | Kydd |
| 4,412,130 A | 10/1983 | Winters |
| 4,413,642 A | 11/1983 | Smith et al. |
| 4,422,948 A | 12/1983 | Corley et al. |
| 4,467,996 A | 8/1984 | Baugh |
| 4,515,212 A | 5/1985 | Krugh |
| 4,538,684 A | 9/1985 | Sheffield |
| 4,562,888 A | 1/1986 | Collet |
| 4,603,578 A | 8/1986 | Stolz |
| 4,616,721 A | 10/1986 | Furse |
| 4,696,502 A | 9/1987 | Desai |
| 4,834,184 A | 5/1989 | Streich et al. |
| 4,869,321 A | 9/1989 | Hamilton |
| 4,898,245 A | 2/1990 | Braddick |
| 4,928,762 A | 5/1990 | Mamke |
| 4,953,617 A | 9/1990 | Ross et al. |
| 4,997,225 A | 3/1991 | Denis |
| 5,012,863 A | 5/1991 | Springer |
| 5,117,909 A | 6/1992 | Wilton et al. |
| 5,129,956 A | 7/1992 | Christopher et al. |
| 5,176,208 A | 1/1993 | Lalande et al. |
| 5,178,219 A | 1/1993 | Streich et al. |
| 5,197,547 A | 3/1993 | Morgan |
| 5,295,541 A | 3/1994 | Ng et al. |
| 5,330,000 A | 7/1994 | Givens et al. |
| 5,358,048 A | 10/1994 | Brooks |
| 5,456,312 A | 10/1995 | Lynde et al. |
| 5,475,187 A * | 12/1995 | Omnes .................. E21B 23/04 |
| | | 181/102 |
| 5,507,346 A | 4/1996 | Gano et al. |
| 5,580,114 A | 12/1996 | Palmer |
| 5,605,366 A | 2/1997 | Beeman |
| 5,639,135 A | 6/1997 | Beeman |
| 5,678,635 A | 10/1997 | Dunlap et al. |
| 5,685,982 A | 11/1997 | Foster |
| 5,833,001 A | 11/1998 | Song et al. |
| 5,842,518 A | 12/1998 | Soybel et al. |
| 5,881,816 A | 3/1999 | Wright |
| 5,924,489 A | 7/1999 | Hatcher |
| 5,944,101 A | 8/1999 | Hearn |
| 6,041,860 A * | 3/2000 | Nazzal .................... E21B 29/10 |
| | | 73/152.01 |
| 6,130,615 A | 10/2000 | Poteet |
| 6,138,764 A | 10/2000 | Scarsdale et al. |
| 6,155,428 A | 12/2000 | Bailey et al. |
| 6,247,542 B1 | 6/2001 | Kruspe et al. |
| 6,276,452 B1 | 8/2001 | Davis et al. |
| 6,371,204 B1 | 4/2002 | Singh et al. |
| 6,491,108 B1 | 12/2002 | Slup et al. |
| 6,510,947 B1 | 1/2003 | Schulte et al. |
| 6,595,289 B2 | 7/2003 | Tumlin et al. |
| 6,688,386 B2 | 2/2004 | Cornelssen |
| 6,768,106 B2 | 7/2004 | Gzara et al. |
| 6,808,023 B2 | 10/2004 | Smith et al. |
| 6,811,032 B2 | 11/2004 | Schulte et al. |
| 6,899,178 B2 | 5/2005 | Tubel |
| 6,913,084 B2 | 7/2005 | Boyd |
| 7,049,272 B2 | 5/2006 | Sinclair et al. |
| 7,096,950 B2 | 8/2006 | Howlett et al. |
| 7,117,956 B2 | 10/2006 | Grattan et al. |
| 7,150,328 B2 | 12/2006 | Marketz et al. |
| 7,188,674 B2 | 3/2007 | McGavem, III et al. |
| 7,188,675 B2 | 3/2007 | Reynolds |
| 7,218,235 B1 | 5/2007 | Rainey |
| 7,231,975 B2 | 6/2007 | Lavaure et al. |
| 7,249,633 B2 | 7/2007 | Ravensbergen et al. |
| 7,284,611 B2 | 10/2007 | Reddy et al. |
| 7,398,832 B2 | 7/2008 | Brisco |
| 7,405,182 B2 | 7/2008 | Verrett |
| 7,418,860 B2 | 9/2008 | Austerlitz et al. |
| 7,424,909 B2 | 9/2008 | Roberts et al. |
| 7,488,705 B2 | 2/2009 | Reddy et al. |
| 7,497,260 B2 | 3/2009 | Telfer |
| 7,591,305 B2 | 9/2009 | Brookey et al. |
| 7,600,572 B2 | 10/2009 | Slup et al. |
| 7,712,527 B2 | 5/2010 | Roddy |
| 7,762,323 B2 | 7/2010 | Frazier |
| 7,802,621 B2 | 9/2010 | Richards et al. |
| 7,934,552 B2 | 5/2011 | La Rovere |
| 7,965,175 B2 | 6/2011 | Yamano |

(56) References Cited

U.S. PATENT DOCUMENTS

| | | |
|---|---|---|
| 8,002,049 B2 | 8/2011 | Keese et al. |
| 8,069,916 B2 | 12/2011 | Giroux et al. |
| 8,201,693 B2 | 6/2012 | Jan |
| 8,376,051 B2 | 2/2013 | McGrath et al. |
| 8,453,724 B2 | 6/2013 | Zhou |
| 8,496,055 B2 | 7/2013 | Mootoo et al. |
| 8,579,024 B2 | 11/2013 | Mailand et al. |
| 8,596,463 B2 | 12/2013 | Burkhard |
| 8,726,983 B2 | 5/2014 | Khan |
| 8,770,276 B1 | 7/2014 | Nish et al. |
| 8,899,338 B2 | 12/2014 | Elsayed et al. |
| 8,991,489 B2 | 3/2015 | Redlinger et al. |
| 9,079,222 B2 | 7/2015 | Burnett et al. |
| 9,109,433 B2 | 8/2015 | DiFoggio et al. |
| 9,133,671 B2 | 9/2015 | Kellner |
| 9,163,469 B2 | 10/2015 | Broussard et al. |
| 9,181,782 B2 | 11/2015 | Berube et al. |
| 9,212,532 B2 | 12/2015 | Leuchtenberg et al. |
| 9,234,394 B2 | 1/2016 | Wheater et al. |
| 9,359,861 B2 | 6/2016 | Burgos |
| 9,410,066 B2 | 8/2016 | Ghassemzadeh |
| 9,416,617 B2 | 8/2016 | Wiese et al. |
| 9,551,200 B2 | 1/2017 | Read et al. |
| 9,574,417 B2 | 2/2017 | Laird et al. |
| 9,657,213 B2 | 5/2017 | Murphy et al. |
| 9,976,407 B2 | 5/2018 | Ash et al. |
| 10,087,752 B2 | 10/2018 | Bedonet |
| 10,198,929 B2 | 2/2019 | Snyder |
| 10,266,698 B2 | 4/2019 | Cano et al. |
| 10,280,706 B1 | 5/2019 | Sharp, III |
| 10,301,898 B2 | 5/2019 | Orban |
| 10,301,989 B2 | 5/2019 | Imada |
| 2002/0053428 A1 | 5/2002 | Maples |
| 2002/0139528 A1 | 10/2002 | Surjaatmadja |
| 2003/0047312 A1 | 3/2003 | Bell |
| 2003/0098064 A1 | 5/2003 | Kohli et al. |
| 2003/0132224 A1 | 7/2003 | Spencer |
| 2004/0040707 A1 | 3/2004 | Dusterhoft et al. |
| 2004/0074819 A1 | 4/2004 | Burnett |
| 2004/0095248 A1 | 5/2004 | Mandel |
| 2005/0167097 A1 | 8/2005 | Sommers et al. |
| 2005/0263282 A1 | 12/2005 | Jeffrey et al. |
| 2006/0082462 A1 | 4/2006 | Crook |
| 2006/0105896 A1 | 5/2006 | Smith et al. |
| 2007/0137528 A1 | 6/2007 | Le Roy-Ddelage et al. |
| 2007/0181304 A1 | 8/2007 | Rankin et al. |
| 2007/0256867 A1 | 11/2007 | DeGeare et al. |
| 2008/0236841 A1 | 10/2008 | Howlett et al. |
| 2008/0251253 A1 | 10/2008 | Lumbye |
| 2008/0314591 A1 | 12/2008 | Hales et al. |
| 2009/0194290 A1 | 8/2009 | Parks et al. |
| 2009/0250220 A1 | 10/2009 | Stamoulis |
| 2010/0006279 A1* | 1/2010 | Martinez ............ E21B 41/00 166/66 |
| 2010/0263856 A1 | 10/2010 | Lynde et al. |
| 2010/0270018 A1 | 10/2010 | Howlett |
| 2011/0036570 A1 | 2/2011 | La Rovere et al. |
| 2011/0056681 A1 | 3/2011 | Khan |
| 2011/0067869 A1 | 3/2011 | Bour et al. |
| 2011/0168411 A1 | 7/2011 | Braddick |
| 2011/0203794 A1 | 8/2011 | Moffitt et al. |
| 2011/0259609 A1 | 10/2011 | Hessels et al. |
| 2011/0273291 A1 | 11/2011 | Adams |
| 2011/0278021 A1 | 11/2011 | Travis et al. |
| 2012/0012335 A1 | 1/2012 | White et al. |
| 2012/0118571 A1 | 5/2012 | Zhou |
| 2012/0170406 A1 | 7/2012 | DiFoggio et al. |
| 2013/0134704 A1 | 5/2013 | Klimack |
| 2013/0240207 A1 | 9/2013 | Frazier |
| 2013/0269097 A1 | 10/2013 | Alammari |
| 2013/0296199 A1 | 11/2013 | Ghassemzadeh |
| 2014/0158350 A1 | 6/2014 | Castillo et al. |
| 2015/0184476 A1* | 7/2015 | Robertson ............ E21B 43/123 166/382 |
| 2016/0084034 A1 | 3/2016 | Roane et al. |
| 2016/0130914 A1 | 5/2016 | Steele |
| 2016/0237810 A1 | 8/2016 | Beaman et al. |
| 2016/0281458 A1 | 9/2016 | Greenlee |
| 2016/0305215 A1 | 10/2016 | Harris et al. |
| 2017/0044864 A1 | 2/2017 | Sabins et al. |
| 2017/0058628 A1 | 3/2017 | Wijk et al. |
| 2017/0067313 A1 | 3/2017 | Connell et al. |
| 2017/0089166 A1 | 3/2017 | Sullivan |
| 2018/0010418 A1 | 1/2018 | VanLue |
| 2018/0187498 A1 | 7/2018 | Soto et al. |
| 2018/0209565 A1 | 7/2018 | Lingnau |
| 2018/0245427 A1 | 8/2018 | Jimenez et al. |
| 2018/0252069 A1 | 9/2018 | Abdollah et al. |
| 2018/0363424 A1 | 12/2018 | Schroeder et al. |
| 2019/0024473 A1 | 1/2019 | Arefi |
| 2019/0049017 A1 | 2/2019 | McAdam et al. |
| 2019/0087548 A1 | 3/2019 | Bennett et al. |
| 2019/0195035 A1* | 6/2019 | AlBahrani ............ E21B 21/103 |
| 2019/0284898 A1 | 9/2019 | Fagna et al. |
| 2019/0316424 A1 | 10/2019 | Robichaux et al. |
| 2020/0032604 A1 | 1/2020 | Al-Ramadhan |

FOREIGN PATENT DOCUMENTS

| | | |
|---|---|---|
| CA | 2734032 | 6/2016 |
| CN | 103785923 | 6/2016 |
| CN | 104712320 | 12/2016 |
| DK | 2236742 | 8/2017 |
| EP | 2964874 | 1/2016 |
| GB | 958734 | 5/1964 |
| GB | 2392183 | 2/2004 |
| GB | 2414586 | 11/2005 |
| GB | 2425138 | 10/2006 |
| GB | 2453279 | 1/2009 |
| GB | 2492663 | 1/2014 |
| OA | 5503 A | 4/1981 |
| WO | WO 1989012728 | 12/1989 |
| WO | WO 2002090711 | 11/2002 |
| WO | WO 2010132807 | 11/2010 |
| WO | WO 2012164023 | 12/2012 |
| WO | WO 2016040310 | 3/2016 |
| WO | WO 2017043977 | 3/2017 |
| WO | WO 2017158573 | 9/2017 |
| WO | WO 2018017104 | 1/2018 |
| WO | WO 2018164680 | 9/2018 |
| WO | WO 2019132877 | 7/2019 |

OTHER PUBLICATIONS

Al-Ibrahim et al., "Automated Cyclostratigraphic Analysis in Carbonate Mudrocks Using Borehole Images," posted presented at the 2014 AAPG Annual Convention and Exhibition, Search and Discovery Article #41425, Apr. 6-9, 2014, 4 pages.

Bautista et al., "Probability-based Dynamic TimeWarping for Gesture Recognition on RGB-D data," WDIA 2012: Advances in Depth Image Analysis and Application, 126-135, International Workshop on Depth Image Analysis and Applications, 2012, 11 pages.

Boriah et al., "Similarity Measures for Categorical Data: A Comparative Evaluation," presented at the SIAM International Conference on Data Mining, SDM 2008, Apr. 24-26, 2008, 12 pages.

Bruton et al., "Whipstock Options for Sidetracking," Oilfield Review, 26:1, Spring 2014, 10 pages.

Edwards et al., "Assessing Uncertainty in Stratigraphic Correlation: A Stochastic Method Based on Dynamic Time Warping," RM13, Second EAGE Integrated Reservoir Modelling Conference, Nov. 16-19, 2014, 2 pages.

Edwards, "Construction de modèles stratigraphiques à partir de données éparses," Stratigraphie, Université de Lorraine, 2017, 133 pages, English abstract.

Fischet, "The Lofer Cyclothems of the Alpine Triassic," published in Merriam, Symposium on cyclic sedimentation: Kansas Geological Survey, Bulletin 169: 107-149, 1964, 50 pages.

Hernandez-Vela et al., "Probability-based Dynamic Time Warping and Bag-of-Visual-and-Depth-Words for human Gesture Recognition in RGB-D," Pattern Recognition Letters 50: 112-121, 2014, 10 pages.

(56) References Cited

OTHER PUBLICATIONS

Herrera and Bann, "Guided seismic-to-well tying based on dynamic time warping," SEG Las Vegas 2012 Annual Meeting, Nov. 2012, 6 pages.

Keogh and Ratanamahatana, "Exact indexing of dynamic time warping," Knowledge and Information Systems, Springer-Verlag London Ltd., 2004, 29 pages.

Lallier et al., "3D Stochastic Stratigraphic Well Correlation of Carbonate Ramp Systems," IPTC 14046, presented at the International Petroleum Technology Conference, IPTC, Dec. 7-9, 2009, 5 pages.

Lallier et al., "Management of ambiguities in magnetostratigraphic correlation," Earth and Planetary Science Letters, 371-372: 26-36, 2013, 11 pages.

Lallier et al., "Uncertainty assessment in the stratigraphic well correlation of a carbonate ramp: Method and application of the Beausset Basin, SE France," C. R. Geoscience 348: 499-509, 2016, 11 pages.

Lineman et al., "Well to Well Log Correlation Using Knowledge-Based Systems and Dynamic Depth Warping," SPWLA Twenty-Eighth Annual Logging Symposium, Jun. 29-Jul. 2, 1987, 25 pages.

Nakanishi and Nakagawa, "Speaker-Independent Word Recognition by Less Cost and Stochastic Dynamic Time Warping Method," ISCA Archive, European Conference on Speech Technology, Sep. 1987, 4 pages.

Pels et al., "Automated biostratigraphic correlation of palynological records on the basis of shapes of pollen curves and evaluation of next-best solutions," Palaeogeography, Palaeoclimatology, Palaeoecology 124: 17-37, 1996, 21 pages.

Pollack et al., "Automatic Well Log Correlation," AAPG Annual Convention and Exhibition, Apr. 3, 2017, 1 page, Abstract Only.

Rudman and Lankston, "Stratigraphic Correlation of Well Logs by Computer Techniques," The American Assoociation of Petroleum Geologists, vol. 53, No. 3: 557-588, Mar. 1973, 12 pages.

Sakoe and Chiba, "Dynamic Programming Algorithm Optimization for Spoken Word Recognition," IEEE Transactions on Acoustics, Speech and Signal Processing, ASSP-26:1, Feb. 1978, 7 pages.

Salvador and Chan, "FastDTW: Toward Accurate Dynamic Time Warping in Linear Time and Space," presented at the KDD Workshop on Mining Temporal and Sequential Data, Intelligent Data Analysis 11(5):70-80, Jan. 2004, 11 pages.

Sayhi, "peakdet: Peak detection using MATLAB," Jul. 2012, 4 pages.

Scribd [online], "Milling Practices and Procedures," retrieved from URL <https://www.scribd.com/document/358420338/Milling-Rev-2-Secured>, 80 pages.

Silva and Koegh, "Prefix and Suffix Invariant Dynamic Time Warping," presented at the IEEE 16th International Conference on Data Mining, 2016, 6 pages.

Smith and Waterman, "New Stratigraphic Correlation Techniques," Journal of Geology, 88: 451-457, 1980, 8 pages.

Startzman and Kuo, "A Rule-Based System for Well Log Correlation," SPE Formative Evaluation, Society of Petroleum Engineers, Sep. 1987, 9 pages.

Tam International Inflatable and Swellable Packers, "Tam Scab Liner brochure," Tam International, available on or before Nov. 15, 2016, 4 pages.

Tomasi et al., "Correlation optimized warping and dynamic time warping as preprocessing methods for chromatographic data," Journal of Chemometrics 18: 231-241, 2004, 11 pages.

Uchida et al., "Non-Markovian Dynamic Time Warping," presented at the 21st International Conference on Pattern Recognition, ICPR, Nov. 11-15, 2012, 4 pages.

Waterman and Raymond, "The Match Game: New Stratigraphic Correlation Algorithms," Mathematical Geology, 19: 2, 1987, 19 pages.

Zoraster et al., "Curve Alignment for Well-to-Well Log Correlation," SPE 90471, presented at the SPE Annual Technical Conference and Exhibition, Society of Petroleum Engineers, Sep. 26-29, 2004, 6 pages.

* cited by examiner

202
deploying a downhole welding tool to a leak interval that spans an opening in the pipe

204
actuating the downhole welding tool to adjust a welding device of the downhole welding tool from a collapsed configuration in which the welding device is oriented parallel to a tool body of the downhole welding tool and is spaced from an inner surface of the pipe to an extended configuration in which the welding device projects outward from the tool body to the pipe at an acute angle relative to the tool body

206
activating the welding device while the welding device is in the extended configuration

208
consuming a welding tip of the welding device while the welding device is in an activated state to form a weld along the opening in the pipe to repair the leak

DOWNHOLE WELDING TOOLS AND RELATED METHODS

TECHNICAL FIELD

This disclosure relates to downhole welding tools and related methods of repairing a leak in a pipe.

BACKGROUND

Casing leaks are common occurrences that happen during drilling and workover operations in oil fields. Such leaks can negatively impact production rates and the integrity of wells in which the casings are installed. Casing leaks may occur due to a number of reasons, such as corrosion, errosion, and high production rates. A casing leak is typically repaired by squeezing cement across a leak interval or setting a casing patch across the leak interval. However, such methods are often costly, time-consuming, and inefficient.

SUMMARY

This disclosure relates to a downhole welding tool and a method of repairing a casing leak using the downhole welding tool. The downhole welding tool includes an elongate tool body that is deployable on a wireline, multiple welding modules for welding an internal wall of a surrounding casing to cure the casing leak, and a motor that actuates the welding modules. The motor and the welding modules are carried on the tool body, and the welding modules are spaced axially along the tool body. Each welding module includes multiple pivotable carrier arms that are distributed about a circumference of the tool body, multiple welding tips that are respectively carried by the multiple carrier arms, and a piston that is movable by the motor to actuate the carrier arms. The piston is movable in a first axial direction to pivot the carrier arms radially outward from the tool body into an open, extended configuration in which the welding tips contact the casing at the opening, and the piston is movable in a second, opposite axial direction to allow the carrier arms to collapse radially inward back to the tool body into a closed, collapsed configuration once the welding tips have been melted to form a weld at the opening in the casing to close the opening and thereby repair the leak.

In one aspect, a downhole welding tool includes a tool body and a welding device coupled to the tool body. The welding device includes a carrier arm reversibly pivotable between a collapsed configuration of the welding device in which the carrier arm is oriented parallel to the tool body and an extended configuration of the welding device in which the carrier arm projects outward from the tool body at an acute angle relative to the tool body, as well as a consumable welding tip secured to the carrier arm. The downhole welding tool also includes a rotatable actuator coupled to the tool body adjacent the welding device and configured to adjust the carrier arm between the collapsed configuration and the extended configuration.

Embodiments may provide one or more of the following features.

In some embodiments, the welding device further includes a shoulder pin that couples the carrier arm to an exterior wall of the tool body.

In some embodiments, the downhole welding tool further includes a fastener that is connected to the tool body and to the carrier arm to secure the welding device to the tool body.

In some embodiments, the fastener includes a shear pin that is configured to break to allow the carrier arm to pivot from the collapsed configuration to the extended configuration upon receiving a contact force from the rotatable actuator that exceeds a threshold force.

In some embodiments, the downhole welding tool further includes a piston disposed within the tool body and movable axially to contact the rotatable actuator for rotating the rotatable actuator from a first position in which the welding device is in the collapsed configuration to a second position that adjusts the welding device from the collapsed configuration to the extended configuration.

In some embodiments, the downhole welding tool further includes a motor that is coupled to the piston.

In some embodiments, the rotatable actuator includes a peddle.

In some embodiments, the downhole welding tool further includes one or more additional welding devices coupled to the tool body, wherein the welding device and the one or more additional welding devices together form multiple first welding devices that are distributed about a circumference of the tool body at a first axial position along the tool body.

In some embodiments, the downhole welding tool further includes one or more additional rotatable actuators respectively coupled to the tool body adjacent the one or more additional welding devices, wherein the rotatable actuator and the one or more additional rotatable actuators together form multiple first rotatable actuators that are distributed about the circumference of the tool body at the first axial position along the tool body.

In some embodiments, the multiple first welding devices and the multiple first rotatable actuators together form a first welding module, the downhole welding tool further including a second welding module that includes multiple second welding devices and multiple second rotatable actuators.

In some embodiments, the first welding module is located at the first axial position and the second welding module is located at a second axial position that is axially spaced from the first axial position.

In some embodiments, the first welding module is oriented at a first angular position and the second welding module is oriented at a second angular position that is angularly offset from the first angular position.

In some embodiments, the tool body, the welding device, and the rotatable actuator respectively are a first tool body, a first welding device, and a first rotatable actuator that together form a first welding assembly, and the downhole welding tool further includes a second welding assembly. The second welding assembly includes a second tool body, a second welding device coupled to the second tool body and including a carrier arm reversibly pivotable between a collapsed configuration of the second welding device in which the carrier arm is oriented parallel to the second tool body and an extended configuration of the second welding device in which the carrier arm projects outward from the second tool body at an acute angle relative to the second tool body, as well as a consumable welding tip secured to the carrier arm. The second welding assembly further includes a second rotatable actuator coupled to the second tool body adjacent the second welding device and configured to adjust the carrier arm between the collapsed configuration and the extended configuration.

In some embodiments, the first welding assembly is oriented at a first angular position and the second welding assembly is oriented at a second angular position that is angularly offset from the first angular position.

In some embodiments, the consumable welding tip is configured to be activated to form a weld at an adjacent metal wall.

In another aspect, a method of repairing a leak in a pipe includes deploying a downhole welding tool to a leak interval that spans an opening in the pipe, actuating the downhole welding tool to adjust a welding device of the downhole welding tool from a collapsed configuration in which the welding device is oriented parallel to a tool body of the downhole welding tool and is spaced from an inner surface of the pipe to an extended configuration in which the welding device projects outward from the tool body to the pipe at an acute angle relative to the tool body, activating the welding device while the welding device is in the extended configuration, and consuming a welding tip of the welding device while the welding device is in an activated state to form a weld along the opening in the pipe to repair the leak.

Embodiments may provide one or more of the following features.

In some embodiments, the method further includes locating the downhole welding tool at the leak interval using a locating device that is coupled to the tool body.

In some embodiments, the method further includes pulling the downhole welding tool in an uphole direction within the pipe while maintaining the welding device in the activated state to form a welded interval along the pipe that axially spans the leak interval.

In some embodiments, the method further includes deactivating the welding device after the weld is formed, adjusting the welding device to the collapsed configuration, and removing the downhole welding tool from the pipe while the welding device is in the collapsed configuration.

In some embodiments, the method further includes performing a pressure test at the pipe to check an integrity of a wall of the pipe after the weld is formed.

The details of one or more embodiments are set forth in the accompanying drawings and description. Other features, aspects, and advantages of the embodiments will become apparent from the description, drawings, and claims.

DETAILED DESCRIPTION

Figure 1:
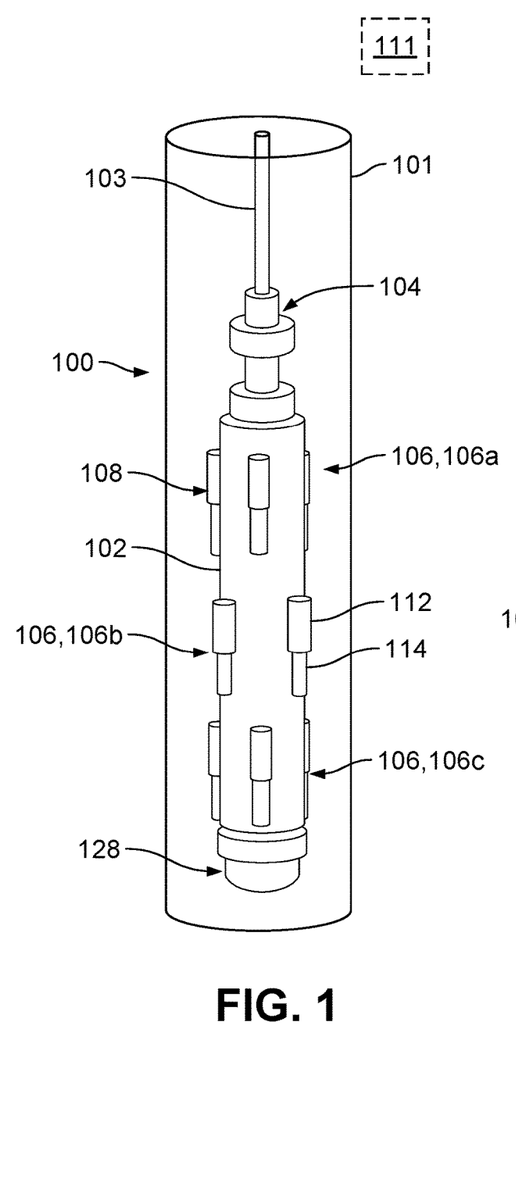
FIG. 1 is a front perspective view of a downhole welding tool with welding devices in a closed, collapsed configuration.
Figure 2:
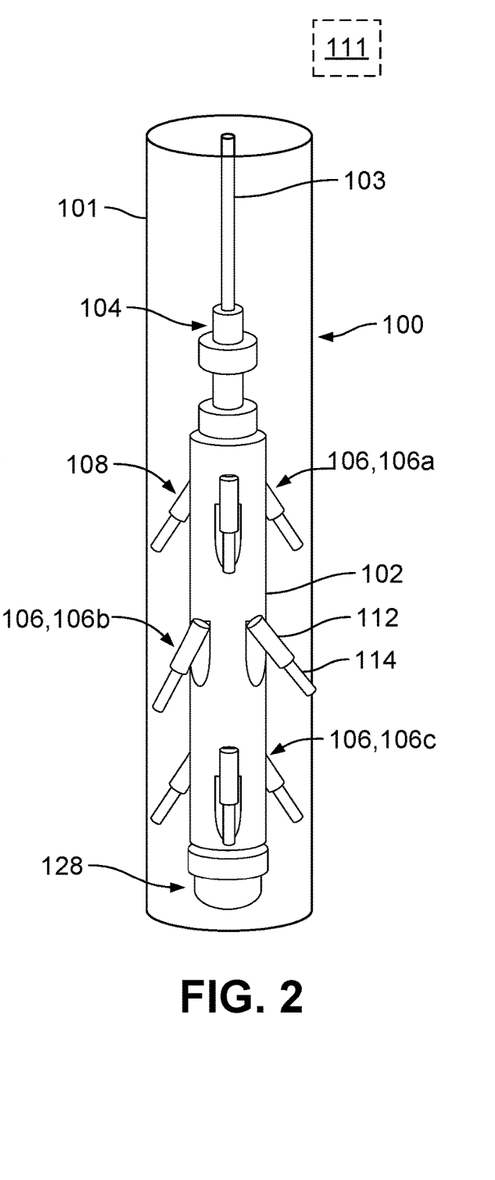
FIG. 2 is a front perspective view of the downhole welding tool of FIG. 1 with the welding devices in an open, extended configuration.

FIGS. 1 and 2 illustrate a downhole welding tool 100 that is designed to repair a leak in a surrounding pipe 101 (for example, a casing) installed within a wellbore. The downhole welding tool 100 is deployable on a wireline 103 and includes an elongate tool body 102 and a connector 104 by which the tool body 102 is attachable to the wireline 103. The downhole welding tool 100 further includes a terminal end 128 that extends from the tool body 102 and multiple welding modules 106 that are carried on the tool body 102 for welding the surrounding pipe at an opening 105 (for example, a crack or material void) that causes the leak in the pipe. The welding modules 106 (for example, welding modules 106a, 106b, 106c) are spaced axially along the tool body 102, and each welding module 106 includes multiple welding devices 108 that are distributed (for example, at approximately equal angular intervals) about a circumference of the tool body 102. Via the wireline 103, the downhole welding tool 100 may be in electrical communication with a surface controller 111 that controls various operations of the downhole welding tool, as will be discussed in more detail below.

Figure 3:
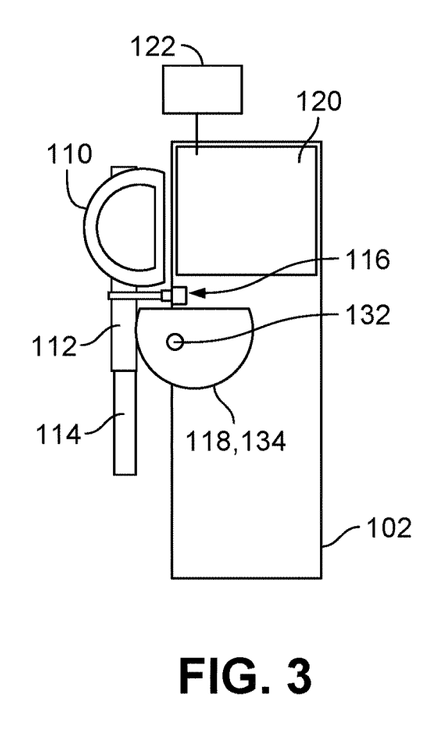
FIG. 3 is an enlarged cross-sectional side view of a portion of the downhole welding tool of FIG. 1 with a welding device in the closed, collapsed configuration, a shear pin in an intact state, and a welding tip in an intact state.

Referring to FIGS. 1-3, the each welding device 108 includes a shoulder pin 110 that is attached to the tool body 102, a carrier arm 112 that is supported by and pivotable about the shoulder pin 110, and a welding tip 114 (for example, a welding rod) that is secured to the carrier arm 112. Each welding module 106 also includes multiple shear pins 116 that are attached to the tool body 102 and respectively attached to the multiple carrier arms 112 to secure the multiple welding devices 108 to the tool body 102 in a collapsed configuration, as shown in FIG. 3. The shear pins 116 lock the welding devices 108 in place against the tool body 102 to prevent the welding devices 108 from being damaged during tripping of the downhole welding tool 100 within a wellbore. Each welding module 106 further includes multiple actuators 118 that are respectively associated with the multiple welding devices 108 and that are secured to the tool body 102 at respective support pins 132.

Figure 4:
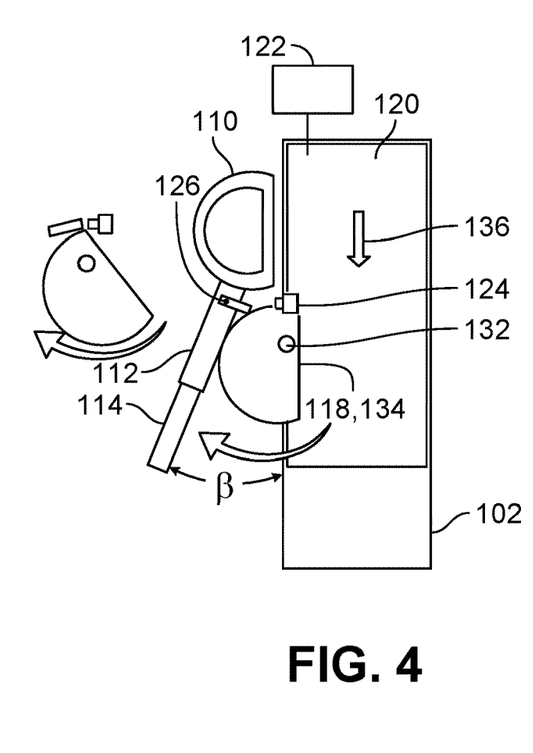
FIG. 4 is an enlarged cross-sectional side view of the portion of the downhole welding tool of FIG. 3 with the welding device in the open, extended configuration, the shear pin in a broken state, and the welding tip in the intact state.

Referring to FIG. 4, each actuator 118 includes a support pin 132 and a peddle 134 that is rotatable about the support pin 132 to break the respective shear pin 116, thereby allowing the actuator 118 to push the welding device 108 out of a collapsed configuration (for example, a closed configuration) in which the carrier arm 112 is oriented parallel to the tool body 102 and into an extended configuration (for example, an open configuration) in which the carrier arm 112 projects outward at an acute angle β relative to the tool body 102. Accordingly, the downhole welding tool 100 further includes an elongate piston 120 (for example, a shrouded piston) that is movable axially within the tool body 102 to sequentially contact the actuators 118 within axially spaced welding modules 106 and a motor 122 that is carried on the tool body 102 for controlling movement of the piston 120. The tool body 102, the welding modules 106, the piston 120, and the motor 122 together form a welding assembly 150.

Figure 5:
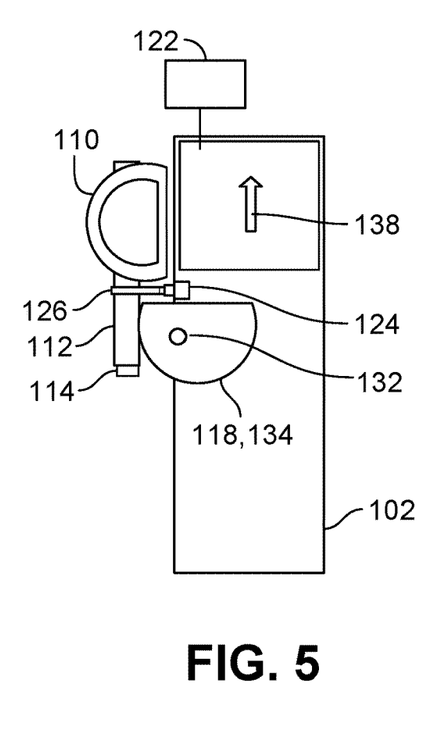
FIG. 5 is an enlarged cross-sectional side view of the portion of the downhole welding tool of FIG. 3 with the welding device in the closed, collapsed configuration, the shear pin in the broken state, and the welding tip in a consumed state.

Referring to FIG. 4, the piston 120 is movable in a first axial direction 136 (for example, a downhole direction) to simultaneously contact all of the actuators 118 that are distributed about a circumference of the tool body 102 within a given welding module 106. Once a contact force of the piston 120 against the actuators 118 exceeds a threshold force of the shear pins 116, transferred application of the contact force from the actuators 118 to the shear pins 116 causes the shear pins 116 break into two portions 124, 126 that are respectively carried by the tool body 102 and the carrier arm 112, thereby allowing the actuators 118 to push the carrier arms 112 radially outward from the tool body 102 into the extended configuration until the welding tips 114 contact the surrounding pipe 101 at the opening 105. Therefore, an inner diameter of the pipe 101 determines an extent to which the welding tips 114 and the attached carrier arms 112 will rotate, such that the downhole welding tool 100 can be used to repair leaks within a pipe of a variable inner diameter in a single run. Referring to FIG. 5, once the welding tips 114 have been activated by the controller 111 and consumed to provide a weld at the opening 105, the piston 120 may be moved in a second, opposite axial direction 138 (for example, an uphole direction) to release the carrier arms 112 radially inward toward the tool body 102 into the collapsed configuration in which the carrier arms 112 rest against the actuators 118.

In the example embodiment of FIGS. 1 and 2, the welding modules 106 include welding modules 106a, 106b, 106c that each include four welding devices 108. The four welding devices 108 within each module 106 are spaced about 45 degrees apart from one another around the circumference of the tool body 102. The welding module 106b has an angular position that is offset by about 45 degrees from an angular position of the welding modules 106a, 106c such that at least one welding device 108 of at least one welding module 106 is positioned at about every 45 degrees around the circumference of the tool body 102 (refer to FIG. 8).

In some embodiments, the tool body 102 has a length that is in a range of about 1 meter (m) to about 1.5 m and an outer diameter that is in a range of about 7.3 centimeters (cm) to about 11.5 cm. In some embodiments, the welding modules 106 are axially spaced from each other (for example, using reference positions of the shoulder pins 110) by a distance that is in a range of about 0.3 m to about 0.5 m. In some embodiments, each carrier arm 112 has a length that is in a range of about 2 cm to about 7 cm based on an inner diameter of the pipe 101. In some embodiments, each welding tip 114 has a length that is in a range of about 2 cm to about 7 cm. The welding tips 114, the tool body 102, and the carrier arms 112 are typically made of metal, such as stainless steel.

Figure 6A:
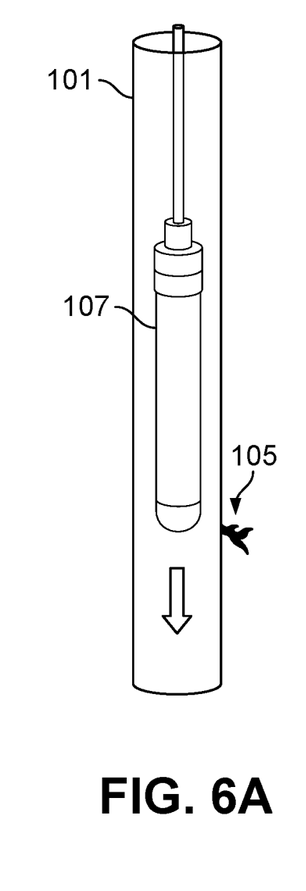
FIGS. 6A-6I illustrate a sequential method of employing the downhole welding tool of FIG. 1 to repair a leak in a pipe.
Figure 6B:
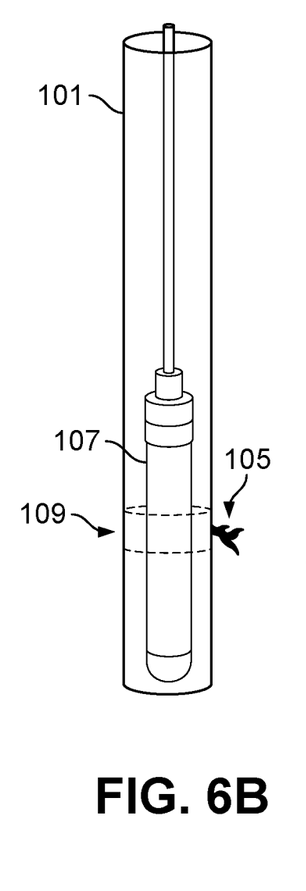
Figure 6C:
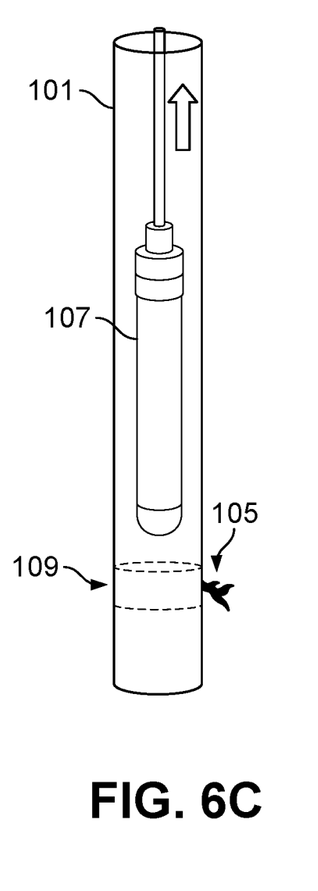

FIGS. 6A-6I illustrate a sequential method of employing the downhole welding tool 100 to repair a leak in the pipe 101. Referring to FIG. 6A, prior to deploying the downhole welding tool 100 to the pipe 101, a logging tool 107 (for example, a multi-finger caliper) is run into the pipe 101 to generate a corrosion log and a caliper log for respective measurements of any metal loss and an internal diameter of the pipe 101. Referring to FIG. 6B, the opening 105 in the surrounding pipe 101 can be detected, along with a depth, a circumferential position, and an area of the opening 105 based on the logs. A leak interval 109 may be defined as an axial section of the pipe 101 that spans the opening 105. Referring to FIG. 6C, the logging tool 107 is then retrieved from the pipe 101.

Figures 6D, 6E, 6F, 6G, 6H:
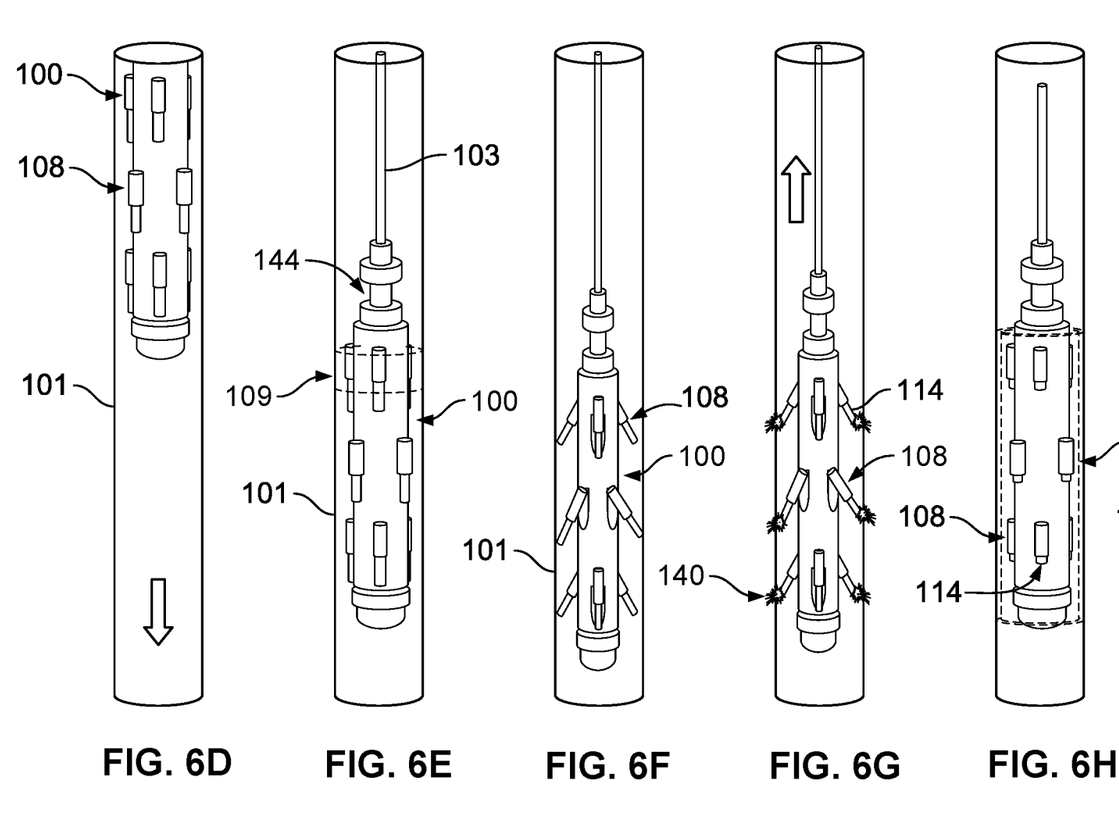
Figure 7:
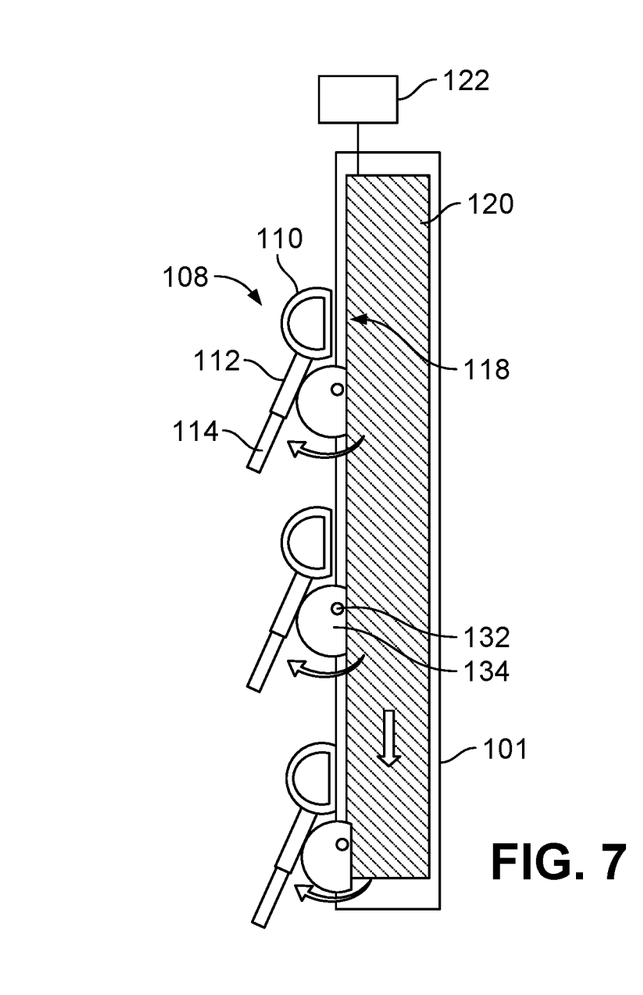
FIG. 7 is a cross-sectional side view of the downhole welding tool of FIG. 1 with all of the welding devices in the open, extended configuration.

Referring to FIGS. 6D and 6E, once the logging tool 107 has been removed from the pipe 101, the downhole welding tool 100 is equipped with a locating device 144 (for example, a casing collar locator (CCL)), deployed to the pipe 101, and axially positioned along the leak interval 109 using data provided by the CCL. In some examples, the downhole welding tool 100 is axially positioned such that the uppermost welding module 106 (for example, the welding module 106a) is located adjacent the leak interval 109. Referring to FIGS. 6F and 7 (shear pins not shown), based on instructions transmitted from the controller 111, the motor 122 is energized via an electric current delivered via the wireline 103 to move the piston 120 in the first axial direction 136 by a distance sufficient to contact the actuators 118 of all of the welding modules 106 to adjust the welding devices 108 from the collapsed configuration to the extended configuration in which the welding tips 114 contact the pipe 101.

Figure 8:
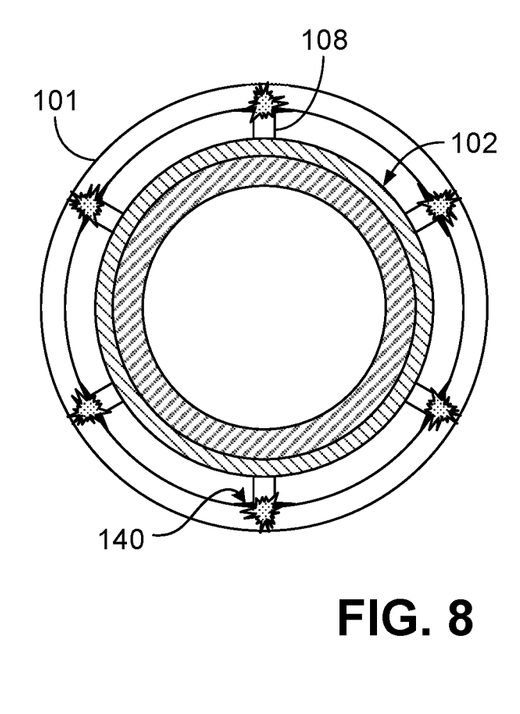
FIG. 8 is a top view of the downhole welding tool of FIG. 1 with the welding devices in the open, extended configuration and in an active state.
Figure 9:
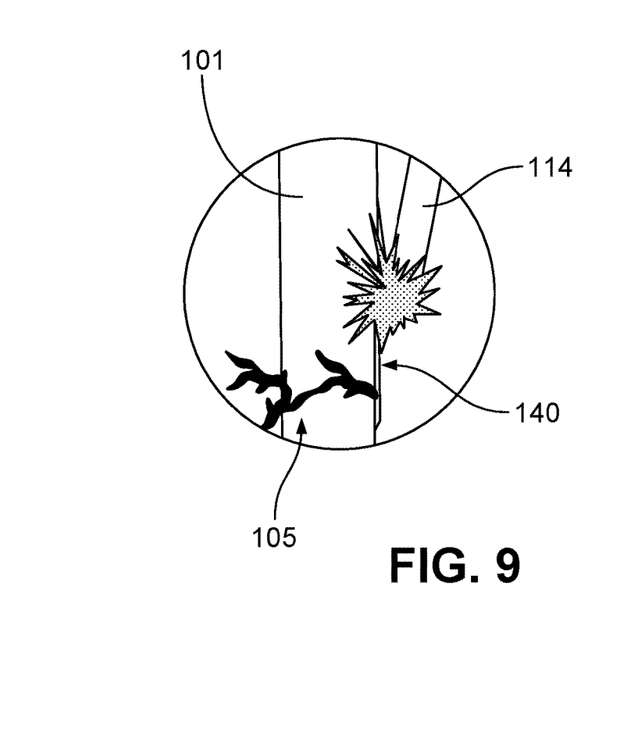
FIG. 9 is an enlarged cross-sectional side view of a weld produced by a welding tip of the downhole welding tool of FIG. 1.

Referring to FIG. 6G, tension is applied to the wireline 103 to confirm that the welding devices 108 are in the extended configuration (for example, contacting the pipe 101), and the surface controller 111 transmits further instructions to activate all of the welding devices 108 such that the carrier arms 112 are supplied with heat to melt the welding tips 114. In some embodiments, the heat is supplied via an electric arc as part of a shielded metal arc, wet welding technique that is cost effective and versatile. Referring to FIGS. 8 and 9, melting of the welding tips 114 against the pipe 101 produces welds 140 at interfaces between the welding tips 114 and the pipe 101. While the welding tips 114 are activated to produce the welds 140, the downhole welding tool 100 is slowly pulled in an uphole direction until the leak interval 109 has been completely traversed by one or more of the welding modules 106. In this manner, the downhole welding tool 100 can be used to perform welding at different depths in a single run.

Referring to FIG. 6H, such movement produces a welded interval 142 that spans the leak interval 109. Since the welding devices 108 are circumferentially located at regular angular intervals around the circumference of the tool body 102, at least one of the welding devices 108 of the various welding modules 106 will have produced a weld 140 with an arc length that laterally spans a circumferential position of the opening 105 in the pipe 101 to repair the leak once the one or more welding modules 106 have completely traversed the leak interval 109. Therefore, the downhole welding tool 100 does not need to be rotated to ensure welding of the pipe 101 along the opening 105. Consumption of the welding tips 114 to produce the welds 140 is also detectable as a decrease in tension in the wireline 103 since the carrier arms 112 are no longer directly coupled to the pipe 101 through contact with the welding tips 114. Based on instructions transmitted from the controller 111, the supply of heat to the carrier arms 112 is terminated, and the motor 122 is de-energized to cause the piston 120 to move in the second axial direction 138 such that the carrier arms 112 are adjusted back into the collapsed configuration of the welding devices 108.

Figure 6I:
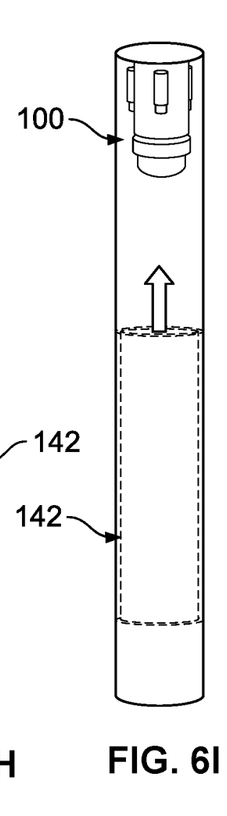

Referring to FIG. 6I, the downhole welding tool 100 is then retrieved from the pipe 101. If necessary, the downhole welding tool 100 can be equipped with new welding tips 114 at the carrier arms 112, redeployed to the leak interval 109, and reactivated to produce additional welds 140. Once the welding job has been completed, one or more processing devices (for example, a reaming device, a pilot mill, and a string mill) are deployed to the pipe 101 at the leak interval 109 to ream the welded interval 142 of the pipe 101 to ensure an appropriate internal diameter along the welded interval 142. Positive and negative pressure tests can subsequently be performed at the pipe 101 to check the integrity of a wall of the pipe 101 for confirming closure of the opening 105 and repair (for example, curing and sealing) of the leak.

Figure 10:
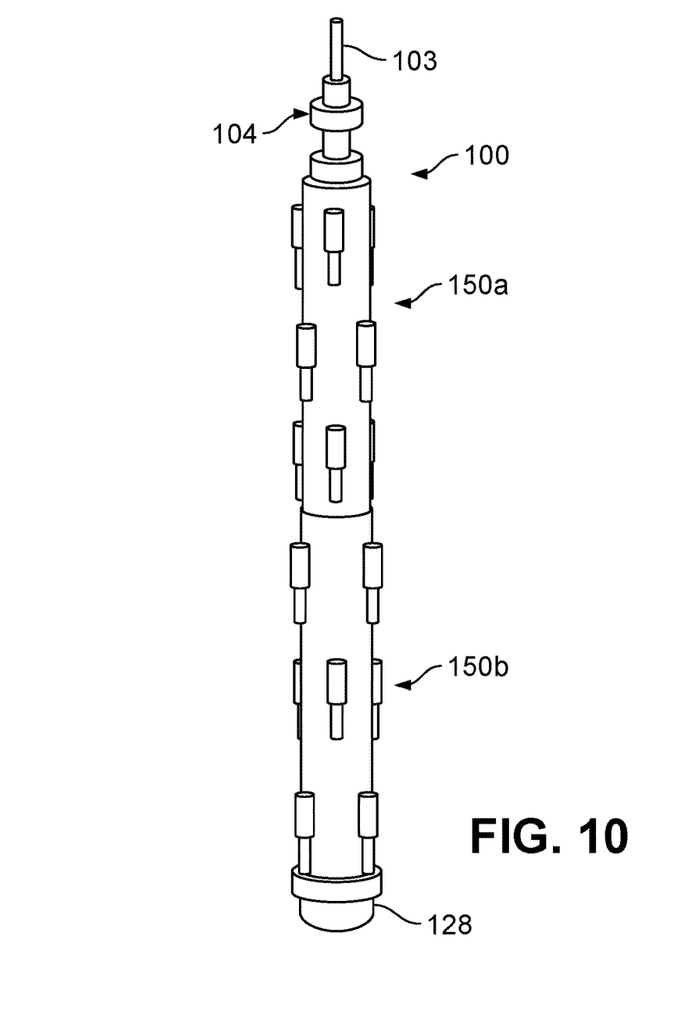
FIG. 10 is a front perspective view of the downhole welding tool of FIG. 1 equipped with an additional welding assembly.

In some embodiments, the downhole welding tool 100 can be further equipped with one or more additional welding assemblies 150. For example, FIG. 10 illustrates the downhole welding tool 100 equipped with a first welding assembly 150a that is oriented at an angle of 180 degrees with respect to a second welding assembly 150b. In some embodiments, the welding assemblies 150a, 150b may be offset circumferentially by an angle of less than 180 degrees such that at least one welding device 108 of at least one welding module 106 is positioned around a circumference of the downhole tool 100 at desired angular increments. In general, the downhole welding tool 100 may be equipped with any number of welding assemblies 150 that are offset circumferentially to provide a configuration in which at least one welding device of at least one welding module 106 is positioned at every 10 degrees around a circumference of the downhole tool 100. Owing to an arc length of each weld 140, such a spacing between the welding devices 108 provides weld coverage for more than 95% of an inner diameter of the pipe 101.

Utilizing the downhole welding tool 100 to cure a casing leak during a drilling and workover operation can save time and reduce costs as compared to conventional methods of curing casing leaks. Furthermore, running the downhole welding tool 100 on a wireline 103 instead of on a drill pipe can save rig time and man power as compared to conventional tools used to repair casing leaks.

Figure 11:
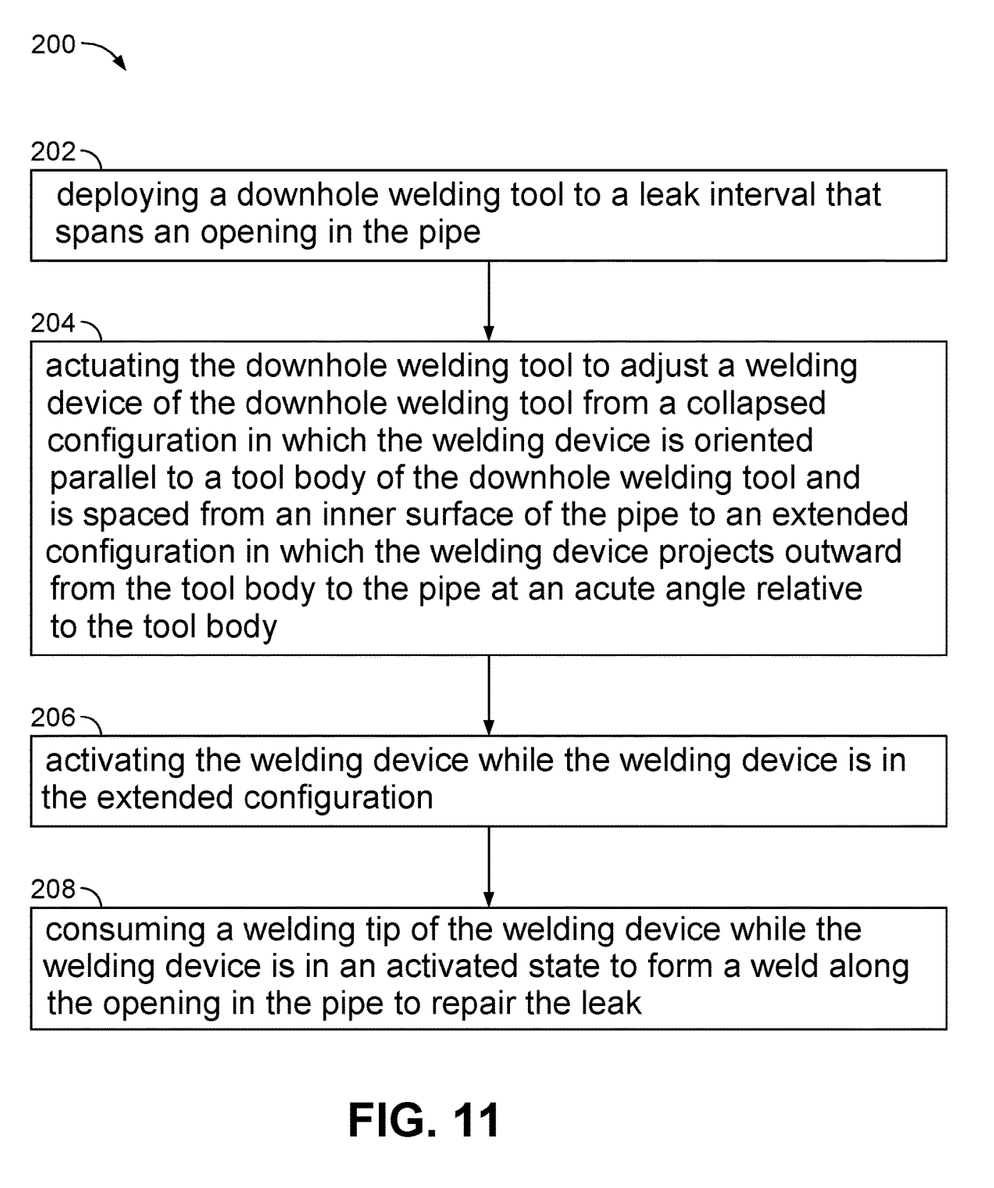
FIG. 11 is a flow chart illustrating an example method of repairing a leak in a pipe using the downhole welding tool of FIG. 1.

FIG. 11 is a flow chart illustrating an example method 200 of repairing a leak in a pipe (for example, the pipe 101) using a downhole welding tool (for example, the downhole welding tool 100). In some embodiments, the method 200 includes a step 202 for deploying the downhole welding tool to a leak interval (for example, the leak interval 109) that spans an opening (for example, the opening 105) in the pipe. In some embodiments, the method 200 further includes a step 204 for actuating the downhole welding tool to adjust a welding device (for example, the welding device 108) of the downhole welding tool from a collapsed configuration in which the welding device is oriented parallel to a tool body (for example, the tool body 102) of the downhole welding tool and is spaced from an inner surface of the pipe to an extended configuration in which the welding device projects outward from the tool body to the pipe at an acute angle relative to the tool body. In some embodiments, the method 200 further includes a step 206 for activating the welding device while the welding device is in the extended configuration. In some embodiments, the method 200 further includes a step 208 for consuming a welding tip (for example, the welding tip 114) of the welding device while the welding device is in an activated state to form a weld (for example, the weld 140) along the opening in the pipe to repair the leak.

While the downhole welding tool 100 has been described and illustrated with respect to certain dimensions, sizes, shapes, arrangements, materials, and methods 200, in some embodiments, a downhole welding tool 100 that is otherwise substantially similar in construction and function to the downhole welding tool 100 may include one or more different dimensions, sizes, shapes, arrangements, configurations, and materials or may be utilized according to different methods. For example, an overall size of the downhole welding tool 100 will typically depend on a size of the pipe 101 and a size of the opening 105 in the pipe 101. In general, the larger is the opening 105, the larger will be the size of the downhole welding tool 100 and the more material will be required.

Figure 12:
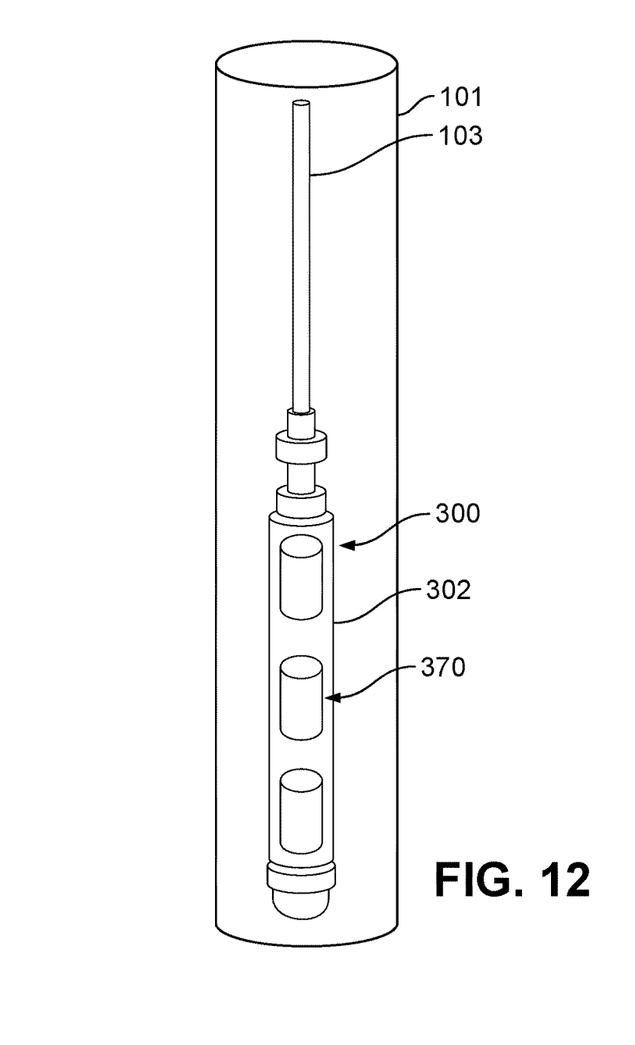
FIG. 12 is a front perspective view of a downhole welding tool with welding devices in a closed, collapsed configuration beneath protective covers.
Figure 13:
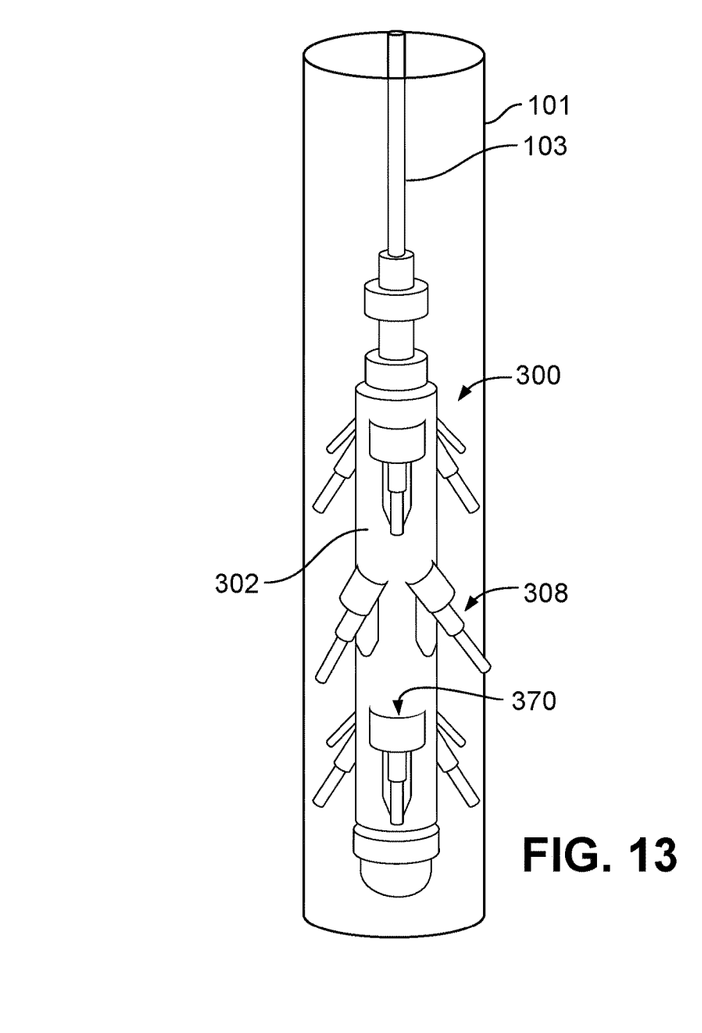
FIG. 13 is a front perspective view of the downhole welding tool of FIG. 12 with the protective covers retracted and with the welding devices in an open, extended configuration.

In an alternative embodiment, as shown in FIGS. 12 and 13, a downhole welding tool 300 may include welding devices 308 that are disposed along an interior region of a tool body 302 and corresponding flush covers 370 that protect the welding devices 308 in a collapsed configuration during tripping. The flush covers 370 can be retracted into the tool body 302 to allow the welding devices 308 to open to an extended configuration to perform a welding operation. The downhole welding tool 300 is otherwise substantially similar in construction, function, and operation to the downhole welding tool 100.

Other embodiments are also within the scope of the following claims.

What is claimed is:

1. A downhole welding tool, comprising:
a tool body;
a welding device coupled to the tool body and comprising:
a carrier arm reversibly pivotable between a collapsed configuration of the welding device in which the carrier arm is oriented parallel to the tool body and an extended configuration of the welding device in which the carrier arm projects outward from the tool body at an acute angle relative to the tool body, and
a consumable welding tip secured to the carrier arm;
a fastener that is connected to the tool body and to the carrier arm to secure the welding device to the tool body; and
a pivotable actuator coupled to the tool body at a support pin and below the fastener, the pivotable actuator being in contact with the welding device such that the pivotable actuator is configured to pivot the carrier arm between the collapsed configuration and the extended configuration,
wherein the welding device further comprises a shoulder pin that couples the carrier arm to an exterior wall of the tool body.

2. The downhole welding tool of claim 1, wherein the fastener comprises a shear pin that is configured to break to allow the carrier arm to pivot from the collapsed configuration to the extended configuration upon receiving a contact force from the pivotable actuator that exceeds a threshold force.

3. The downhole welding tool of claim 1, further comprising a piston disposed within the tool body and movable axially to contact the pivotable actuator for pivoting the pivotable actuator from a first position in which the welding device is in the collapsed configuration to a second position that adjusts the welding device from the collapsed configuration to the extended configuration.

4. The downhole welding tool of claim 3, further comprising a motor that is coupled to the piston.

5. The downhole welding tool of claim 3, wherein the pivotable actuator comprises a peddle.

6. The downhole welding tool of claim 1, further comprising one or more additional welding devices coupled to the tool body, wherein the welding device and the one or more additional welding devices together form a plurality of first welding devices that are distributed about a circumference of the tool body at a first axial position along the tool body.

7. The downhole welding tool of claim 6, further comprising one or more additional pivotable actuators respectively coupled to the tool body adjacent the one or more additional welding devices, wherein the pivotable actuator and the one or more additional pivotable actuators together form a plurality of first pivotable actuators that are distributed about the circumference of the tool body at the first axial position along the tool body.

8. The downhole welding tool of claim 7, wherein the plurality of first welding devices and the plurality of first pivotable actuators together form a first welding module, the downhole welding tool further comprising a second welding module that comprises a plurality of second welding devices and a plurality of second pivotable actuators.

9. The downhole welding tool of claim 8, wherein the first welding module is located at the first axial position and the second welding module is located at a second axial position that is axially spaced from the first axial position.

10. The downhole welding tool of claim 8, wherein the first welding module is oriented at a first angular position and the second welding module is oriented at a second angular position that is angularly offset from the first angular position.

11. The downhole welding tool of claim 1, wherein the tool body, the welding device, and the pivotable actuator respectively comprise a first tool body, a first welding device, and a first pivotable actuator that together form a first welding assembly, the downhole welding tool further comprising a second welding assembly that comprises:
   a second tool body;
   a second welding device coupled to the second tool body and comprising:
      a carrier arm reversibly pivotable between a collapsed configuration of the second welding device in which the carrier arm is oriented parallel to the second tool body and an extended configuration of the second welding device in which the carrier arm projects outward from the second tool body at an acute angle relative to the second tool body, and
      a consumable welding tip secured to the carrier arm; and
   a second pivotable actuator coupled to the second tool body adjacent the second welding device and configured to adjust the carrier arm between the collapsed configuration and the extended configuration.

12. The downhole tool of claim 11, wherein the first welding assembly is oriented at a first angular position and the second welding assembly is oriented at a second angular position that is angularly offset from the first angular position.

13. The downhole tool of claim 1, wherein the consumable welding tip is configured to be activated to form a weld at an adjacent metal wall.

14. A method of repairing a leak in a pipe, the method comprising:
   deploying a downhole welding tool to a leak interval that spans an opening in the pipe, the downhole welding tool comprising:
      a tool body,
      a welding device coupled to the tool body and comprising:
         a carrier arm, and
         a consumable welding tip secured the carrier arm,
      a fastener that is connected to the tool body and to the carrier arm to secure the welding device to the tool body, and
      a pivotable actuator coupled to the tool body at a support pin and below the fastener, the pivotable actuator being in contact with the welding device,
      wherein the welding device further comprises a shoulder pin that couples the carrier arm to an exterior wall of the tool body;
   actuating the downhole welding tool at the pivotable actuator to pivot the welding device from a collapsed configuration in which the welding device is oriented parallel to the tool body and is spaced from an inner surface of the pipe to an extended configuration in which the welding device projects outward from the tool body to the pipe at an acute angle relative to the tool body;
   activating the welding device while the welding device is in the extended configuration; and
   consuming the welding tip of the welding device while the welding device is in an activated state to form a weld along the opening in the pipe to repair the leak.

15. The method of claim 14, further comprising locating the downhole welding tool at the leak interval using a locating device that is coupled to the tool body.

16. The method of claim 14, further comprising pulling the downhole welding tool in an uphole direction within the pipe while maintaining the welding device in the activated state to form a welded interval along the pipe that axially spans the leak interval.

17. The method of claim 14, further comprising:
   deactivating the welding device after the weld is formed;
   adjusting the welding device to the collapsed configuration; and
   removing the downhole welding tool from the pipe while the welding device is in the collapsed configuration.

18. The method of claim 14, further comprising performing a pressure test at the pipe to check an integrity of a wall of the pipe after the weld is formed.

19. A downhole welding tool, comprising:
   a tool body;
   a welding device coupled to the tool body and comprising:
      a carrier arm reversibly pivotable between a collapsed configuration of the welding device in which the carrier arm is oriented parallel to the tool body and an extended configuration of the welding device in which the carrier arm projects outward from the tool body at an acute angle relative to the tool body, and
      a consumable welding tip secured to the carrier arm;
   a fastener that is connected to the tool body and to the carrier arm to secure the welding device to the tool body; and
   a pivotable actuator coupled to the tool body at a support pin and below the fastener, the pivotable actuator being in contact with the welding device such that the pivotable actuator is configured to pivot the carrier arm between the collapsed configuration and the extended configuration,
   wherein the fastener comprises a shear pin that is configured to break to allow the carrier arm to pivot from the collapsed configuration to the extended configuration upon receiving a contact force from the pivotable actuator that exceeds a threshold force.

\* \* \* \* \*